(12) United States Patent
Xia et al.

(10) Patent No.: US 10,247,974 B2
(45) Date of Patent: Apr. 2, 2019

(54) BACKLIGHT RUBBER-IRON STRUCTURE AND METHOD OF MANUFACTURING THE SAME, BACKLIGHT AND DISPLAY DEVICE

(71) Applicants: BOE TECHNOLOGY GROUP CO., LTD., Beijing (CN); HEFEI BOE DISPLAY LIGHTING CO., LTD., Anhui (CN)

(72) Inventors: Jitai Xia, Beijing (CN); Qiping Zhang, Beijing (CN); Wenbo Sun, Beijing (CN); Tongmin Liu, Beijing (CN); Xing Wang, Beijing (CN); Sheng Zhang, Beijing (CN)

(73) Assignees: BOE TECHNOLOGY GROUP CO., LTD. (CN); HEFEI BOE DISPLAY LIGHTING CO., LTD. (CN)

( * ) Notice: Subject to any disclaimer, the term of this patent is extended or adjusted under 35 U.S.C. 154(b) by 0 days.

(21) Appl. No.: 15/505,830

(22) PCT Filed: Sep. 8, 2016

(86) PCT No.: PCT/CN2016/098425
§ 371 (c)(1),
(2) Date: Feb. 22, 2017

(87) PCT Pub. No.: WO2017/076124
PCT Pub. Date: May 11, 2017

(65) Prior Publication Data
US 2018/0231824 A1    Aug. 16, 2018

(30) Foreign Application Priority Data
Nov. 4, 2015   (CN) .......................... 2015 1 0757473

(51) Int. Cl.
*G02F 1/1333*    (2006.01)

(52) U.S. Cl.
CPC ...... *G02F 1/133308* (2013.01); *G02F 1/1333* (2013.01); *G02F 2001/133314* (2013.01); *G02F 2001/133325* (2013.01)

(58) Field of Classification Search
CPC ... G02F 1/133308; G02F 2001/133314; G02F 2001/133325
See application file for complete search history.

(56) References Cited

U.S. PATENT DOCUMENTS 8,444,099 B1 *   5/2013   Kuo .................. G02F 1/133308
                                                       248/220.21
2008/0284939 A1   11/2008  Lee et al.
(Continued)

FOREIGN PATENT DOCUMENTS

CN       2842487 Y    11/2006
CN       1928655 A     3/2007
(Continued)

OTHER PUBLICATIONS

First Office Action for Chinese Application No. 201510757473.0, dated Oct. 9, 2017, 7 Pages.
(Continued)

*Primary Examiner* — Mary Ellen Bowman
(74) *Attorney, Agent, or Firm* — Brooks Kushman P.C.

(57) ABSTRACT

A backlight rubber-iron structure and a method of manufacturing the same, a backlight and a display device are disclosed. The backlight rubber-iron structure includes a back plate and a rubber frame. The back plate has a bottom plate and a plurality of folded edges. A plurality of recesses is provided at joints of the bottom plate and the folded edges. Each recess is provided with a connecting hole and a blocking surface. The rubber frame includes a rubber frame body, a connector corresponding to the connecting hole in a one-to-one manner and a blocker corresponding to the recess in a one-to-one manner. The rubber frame body, the con-
(Continued)

nector and the blocker have an integrated structure. The rubber frame body is in the backlight assembly receiving groove. Each blocker is in the corresponding recess and is clamped with the recess by abutting the blocking surface at the bottom of the recess.

12 Claims, 4 Drawing Sheets

(56) References Cited

U.S. PATENT DOCUMENTS

| | | | | |
|---|---|---|---|---|
| 2013/0141665 | A1* | 6/2013 | Huang | G02F 1/133308 349/60 |
| 2017/0059137 | A1* | 3/2017 | Liu | F21V 17/10 |

FOREIGN PATENT DOCUMENTS

| | | | | |
|---|---|---|---|---|
| CN | 201629918 | U | | 11/2010 |
| CN | 102402029 | A | | 4/2012 |
| CN | 104456294 | A | | 3/2015 |
| CN | 104819438 | A | * | 8/2015 ............. F21V 17/10 |
| CN | 105223723 | A | | 1/2016 |
| JP | 2004240239 | A | | 8/2004 |

OTHER PUBLICATIONS

International Search Report and Written Opinion for Application No. PCT/CN2016/098425, dated Nov. 21, 2016, 10 Pages.

Second Office Action for Chinese Application No. 201510757473.0, dated Jul. 5, 2018, 6 Pages.

Second Chinese Office Action CN201629918U dated Feb. 19, 2019 with English Abstract Translation.

\* cited by examiner

BACKLIGHT RUBBER-IRON STRUCTURE AND METHOD OF MANUFACTURING THE SAME, BACKLIGHT AND DISPLAY DEVICE

CROSS-REFERENCE TO RELATED APPLICATIONS

This application is the U.S. national phase of PCT Application No. PCT/CN2016/098425 filed on Sep. 8, 2016, which claims priority to Chinese Patent Application No. 201510757473.0 filed on Nov. 4, 2015, the disclosures of which are incorporated in their entirety by reference herein.

TECHNICAL FIELD

The present disclosure relates to the field of display technology, in particular to a backlight rubber-iron structure and a method of manufacturing the same, a backlight and a display device.

BACKGROUND

With the development trend of thinness and high screen-to-body ratio of liquid crystal display products, the market's requirements for the display effect of the display products are getting higher and higher, the requirements for the quality of the LCD screen backlights are also further improved.

In recent years, the market demand of the liquid crystal displays of tablet computers, notebook computers and other digital products increases, resulting in the amount of backlights used in the liquid crystal displays increases year by year. However, connecting structures in the backlights in the related art decrease the production yield of the backlight products and increases the maintenance difficulty of the products.

SUMMARY

The present disclosure provides a backlight rubber-iron structure and a method of manufacturing the same, a backlight and a display device, which may improve assembly performance of the back plate and the rubber frame in the backlight product, thereby improving assembly efficiency and disassembly efficiency of the backlight products, and reducing failure rate of the backlight products in the assembly and maintenance.

To this end, the embodiments of the present disclosure provide a backlight rubber-iron structure which includes: a back plate and a rubber frame. The back plate includes: a bottom plate, a plurality of folded edges, a backlight assembly receiving groove defined by the bottom plate and the folded edges, a plurality of recesses defined at joints of the bottom plate and the plurality of folded edges, each of the plurality of recesses facing away from the backlight assembly receiving groove with a connecting hole defined through each recess and communicating the each recess with the backlight assembly receiving groove, and a blocking surface defined by at least part of a bottom of each recess located at a periphery of the connecting hole of each recess and facing away from the backlight assembly receiving groove.

The rubber frame includes a rubber frame body, a connector corresponding to the connecting hole in a one-to-one manner, and a blocker corresponding to the recess in a one-to-one manner and connected with the connector. The rubber frame body, the connector and the blocker have an integrated structure.

The rubber frame body is in the backlight assembly receiving groove. The connector extends through the corresponding connecting hole. The blocker is in the corresponding recess and is clamped with the corresponding recess by abutting against the blocking surface at the bottom of the corresponding recess.

In the backlight rubber-iron structure, a nested structure is formed between the recess with the connecting hole at the back plate and the blocker, the connector and the rubber frame body of the rubber frame. Thus, an engaging force between the back plate and the rubber frame in the backlight rubber-iron structure is large. As a result, the backlight rubber-iron structure is not easy to be deformed when disassembled, and then the production yield of the backlight product is improved.

In a possible embodiment, a quantity of recesses at the joints of the bottom plate and the folded edges in the back plate is 13-15.

In a possible embodiment, each recess has a rectangular structure, and a long side direction of the rectangular structure is parallel to an extending direction of the folded edge where the rectangular structure is located.

In a possible embodiment, a cross section of each recess is arc-like or trapezoidal with a width increasing in a direction away from the bottom of the recess.

In a possible embodiment, a distance from a side of the bottom of the recess facing away from the recess to the rubber frame body is 0.5 mm-1 mm.

In a possible embodiment, the blocker and the connector define a T-shaped.

In a possible embodiment, a surface of the blocker facing away from backlight assembly receiving groove is flush with the corresponding folded edge.

The present disclosure further provides a backlight which includes the above-mentioned backlight rubber-iron structure.

The present disclosure further provides a display device which includes the above-mentioned backlight.

The present disclosure further provides a method of manufacturing the above-mentioned backlight rubber-iron structure, which includes:

forming a back plate which includes a bottom plate, a plurality of folded edges, a backlight assembly receiving groove defined by the bottom plate and the folded edges, a plurality of recesses defined at joints of the bottom plate and the plurality of folded edges with each of the plurality of recesses facing away from the backlight assembly receiving groove, a connecting hole defined through each recess and communicating the each recess with the backlight assembly receiving groove, and a blocking surface defined by at least part of a bottom of each recess located at a periphery of the connecting hole of each recess and facing away from the backlight assembly receiving groove;

forming a rubber frame which includes a rubber frame body and an extension portion formed on the rubber frame body and corresponding to the connecting hole in a one-to-one manner;

disposing the rubber frame body into the backlight assembly receiving groove and extending the extension portion through the corresponding connecting hole; and forming a blocker and a connector by performing a heat-deforming process on a part of the extension portion extending through the connecting hole to outside of the backlight assembly receiving groove.

In the backlight rubber-iron structure manufactured by the above-mentioned method, a nested structure is formed between the recess with the connecting hole at the back plate and the blocker, the connector and the rubber frame body of the rubber frame. Thus, an engaging force between the back plate and the rubber frame in the backlight rubber-iron structure is large. As a result, the backlight rubber-iron structure does not require fastening operation in the manufacture of the backlight product and is not easy to be deformed when disassembled, and then the production yield of the backlight product is improved.

In a possible embodiment, the forming the blocker and the connector by performing the heat-deforming process on the part of the extension portion extending through the connecting hole to outside of the backlight assembly receiving groove includes:

using a heating apparatus to heat and soften the part of the extension portion extending through the connecting hole to outside of the backlight assembly receiving groove;

forming the blocker by extending the softened part of the extension portion along a direction of the bottom surface of the recess until abutting against at least part of a periphery part of the connection hole; and form the connector with an un-deformed part of the extension portion located in the connecting hole.

Further, a surface of the blocker facing away from backlight assembly receiving groove is flush with the folded edge.

BRIEF DESCRIPTION OF THE DRAWINGS

FIG. 2b is a side view of the back plate in a B direction as shown in FIG. 2a;

Figure 1:
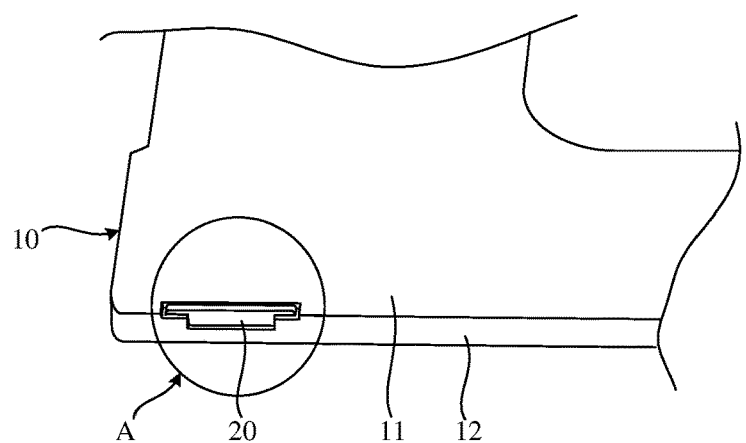
FIG. 1 is a schematic diagram of a backlight rubber-iron structure provided by an embodiment of the present disclosure.

REFERENCE NUMERALS 10, back plate; 11, bottom plate; 12, folded edge; 13, recess; 14, backlight assembly receiving groove; 131, connecting hole; 132, blocking surface; 20, rubber frame; 21, rubber frame body; 22, connector; 23, blocker; 24, extension portion; 30, heating apparatus; 31, heating plane.

DETAILED DESCRIPTION

The technical solutions of the embodiments of the present disclosure will be clearly and completely described below with reference to the accompanying drawings of the embodiments of the present disclosure. Apparently, the described embodiments are only part of the embodiments of the present disclosure, but not all the embodiments. All other embodiments obtained by a person of ordinary skills in the art without any creative work based on the embodiments of the present disclosure are intended to be within the scope of the present disclosure.

As shown in FIG. 1, one embodiment of the present disclosure provides a backlight rubber-iron structure which includes a back plate 10 and a rubber frame 20.

Figure 2A:
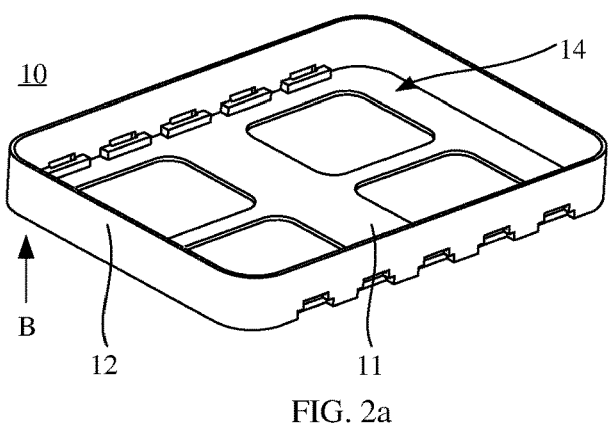
FIG. 2a is a schematic diagram of a back plate as shown in FIG. 1.
Figure 2B:
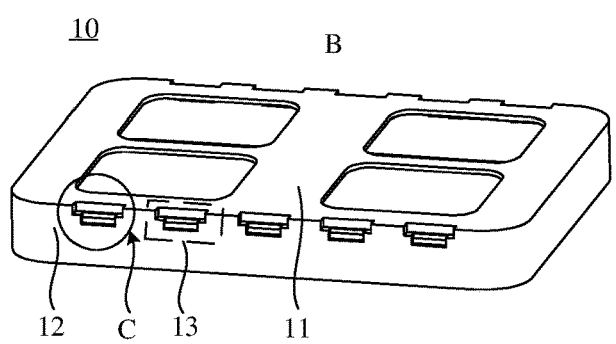
Figure 3:
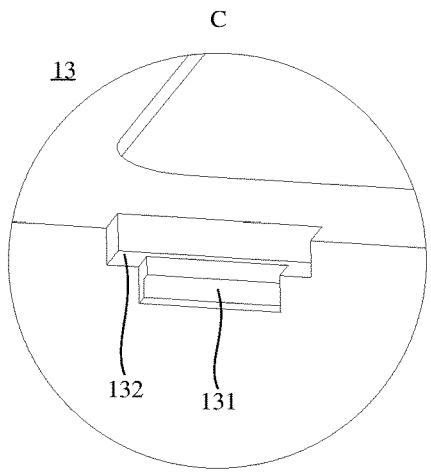
FIG. 3 is an enlarged view of a region C as shown in FIG. 2b.

As shown in FIG. 2a, the back plate 10 has a bottom plate 11 and folded edges 12. A region surrounded by the bottom plate 11 and the folded edges 12 defines a backlight assembly receiving groove 14 to install backlight assemblies such as a backlight. In other embodiments, the folded edge 12 may also be of a folded edge structure which is formed by connecting four planes in series with each other. Referring to FIG. 2b, a view of FIG. 2a in the direction B perpendicular to the bottom plate 11 is shown. A plurality of recesses 13 is defined at joints of the bottom plate 11 and the folded edges 12, and is open away from the backlight assembly receiving groove 14. One of the recesses is shown in one region C. Referring to FIG. 3 which shows an enlarged view of the region C as shown in FIG. 2b, a connecting hole 131 is defined through the recess 13, and the recess 13 is communicated with the backlight assembly receiving groove 14 through the connecting hole 131. At least part of the bottom of the recess 13 located at the periphery of the connecting hole 131 forms a blocking surface 132. The blocking surface 132 faces away from the backlight assembly receiving groove 14. In actual production, the back plate 10 may be manufactured by a pressing method.

Figure 5:
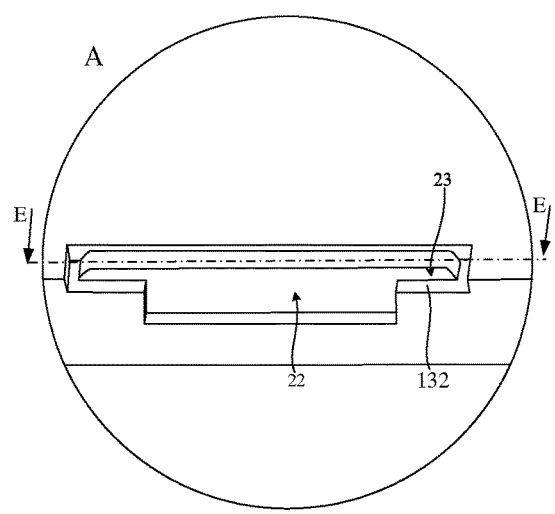
FIG. 5 is a partial enlarged view of a region A as shown in FIG. 1.
Figure 8:
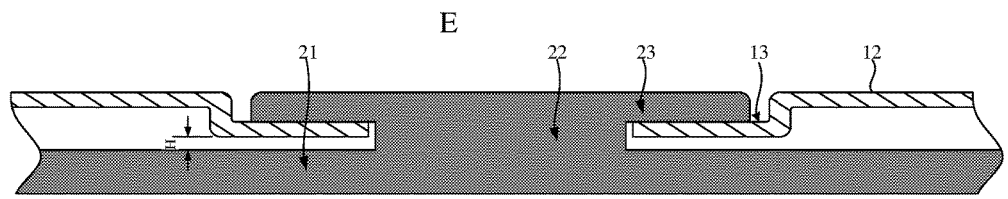
FIG. 8 is a schematic cross-sectional diagram of the structure as shown in FIG. 5 taken along a cutting plane E.

Referring to FIG. 5 and FIG. 8, FIG. 5 is a partial enlarged view of the region A as shown in FIG. 1, and FIG. 8 is a cross-sectional diagram of the structure as shown in FIG. 5 taken along the cutting plane E. The rubber frame 20 includes a rubber frame body 21, a connector 22 corresponding to the connecting hole 131 in a one-to-one manner, and a blocker 23 corresponding to the recess 13 in a one-to-one manner. The rubber frame body 21, the connector 22 and the blocker 23 may have an integrated structure.

The rubber frame body 21 is located in the backlight assembly receiving groove 14.

Each of the connectors 22 extends through the corresponding connecting hole 131.

Each of the blockers 23 is located in the corresponding recess 13 and abuts against the blocking surface 132 located at the bottom of the corresponding recess 13 so as to be clamped with the recess 13.

In actual production, the rubber frame 20 may be manufactured by an injection molding method, and the recess 13 may be provided in the bottom plate 11 at a position other than the joint of the bottom plate 11 and the folded edge 12 based on actual requirements so as to be adapted to different shapes and sizes of the rubber frame.

In the backlight rubber-iron structure, the blocker, the connector and the rubber frame body of the rubber frame together with the recess and the connecting hole in the back plate form a nested structure. Thus, an engaging force between the back plate and the rubber frame in the backlight rubber-iron structure is large. As a result, the backlight rubber-iron structure is not easy to be deformed when disassembled, and the production yield of the backlight product is improved.

In an optional embodiment, the number of the recesses at the joints of the bottom plate and the folded edge of back plate may be 13-15.

In an optional embodiment as shown in FIGS. 2a and 2b, the recess 13 is a rectangular groove structure. A long side direction of the rectangular groove structure is parallel to an extending direction of the folded edge where the recess 13 is located.

In addition, the recess may be of other shapes, for example, a cross section of the recess is arc-like or trapezoidal with a width increasing along a direction away from the bottom of the recess.

In an optional embodiment as shown in FIG. 8, in a direction perpendicular to the bottom of the recess 13, a distance H from the side of the bottom of the recess 13 away from the recess 13 to the rubber frame body 21 is in a range of 0.5 mm-1 mm, e.g., 0.5 mm, 0.6 mm, 0.7 mm, 0.8 mm, 0.9 mm, and 1 mm.

An embodiment of the present disclosure further provides a backlight including the above-mentioned backlight rubber-iron structure. The backlight may be a common backlight such as a direct-light type LED backlight or a side-light type LED backlight.

An embodiment of the present disclosure further provides a display device including the above-mentioned backlight. The display device may be a TN mode display device, and ADS mode display device, an IPS mode display device, which will not be illustrated in detail.

Figure 9:
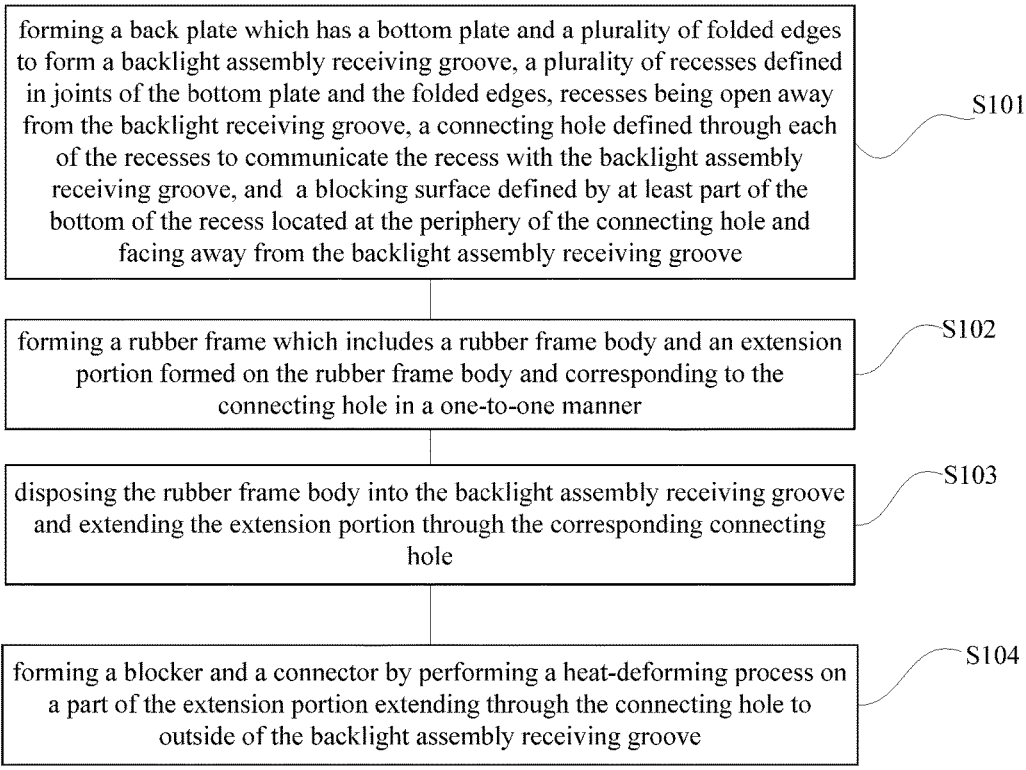
FIG. 9 is a flow chart of a method of manufacturing a backlight rubber-iron structure provided by an embodiment of the present disclosure.

As shown in FIG. 9, an embodiment of the present disclosure further provides a method of manufacturing the above-mentioned backlight rubber-iron structure, which includes the following steps.

Step S101 is to form a back plate 10. The back plate 10 has a bottom plate 11 and a plurality of folded edges 12 to form a backlight assembly receiving groove 14. A plurality of recesses 13 is defined in joints of the bottom plate 11 and the folded edges 12, and is open away from the backlight receiving groove 14. A connecting hole 131 is defined through each of the recesses 13, and the recess 13 is communicated with the backlight assembly receiving groove 14. At least part of the bottom of the recess 13 located at the periphery of the connecting hole 131 forms a blocking surface 132 which faces away from the backlight assembly receiving groove 14. The back plate 10 may be manufactured by a pressing method and the detailed structure of the back plate 10 may refer to FIGS. 2a and 2b.

Figure 4:
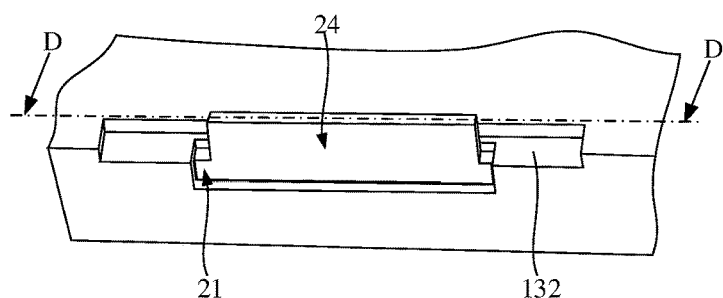
FIG. 4 is a schematic diagram of a rubber-iron structure formed by connecting a rubber frame and a back plate.
Figure 6:
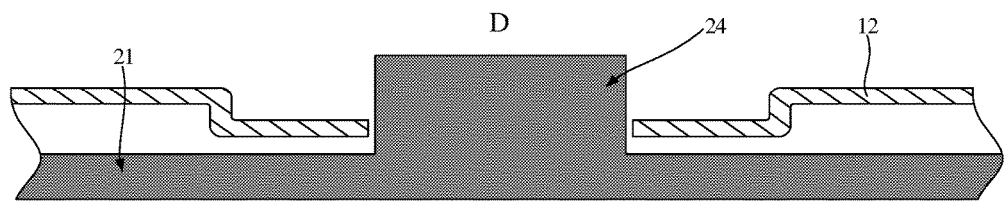
FIG. 6 is a cross-sectional view of an assembled structure as shown in FIG. 4 taken along a cutting plane D.

Step S102 is to form a rubber frame 20. The rubber frame 20 includes a rubber frame body 21 and an extension portion 24 formed on the rubber frame body 21 and corresponding to the connecting hole 131 in a one-to-one manner. The rubber frame 20 may be manufactured by an injection molding method. The detailed structure of the rubber frame 20 may refer to FIG. 4 and FIG. 6. FIG. 6 is a schematic cross-sectional diagram of the structure as shown in FIG. 4 taken along the cutting plane D.

Step S103 is to dispose the rubber frame body 21 into the backlight assembly receiving groove 14 and extend the extension portion 24 through the corresponding connecting hole 131. The resultant assembled structure of back plate 10 and the rubber frame 20 is shown in FIGS. 4 and 6.

Step S104 is to form a blocker 23 and a connector 22 by performing a heat-deforming process on a part of the extension portion 24 extending through the connecting hole to outside of the backlight assembly receiving groove 14. The detailed structures of the blocker 23 and the connector 22 are shown in FIGS. 5 and 8.

In the backlight rubber-iron structure manufactured by the above-mentioned method, a nested structure is formed between the recess 13 with the connecting hole 131 at the back plate 10 and the blocker 23, the connector 22 and the rubber frame body 21 of the rubber frame 20. Thus, an engaging force between the back plate 10 and the rubber frame 20 in the backlight rubber-iron structure is large. As a result, the backlight rubber-iron structure does not require fastening operation in the manufacture of the backlight product and is not easy to be deformed when disassembled, and then the production yield of the backlight product is improved.

Figure 10:
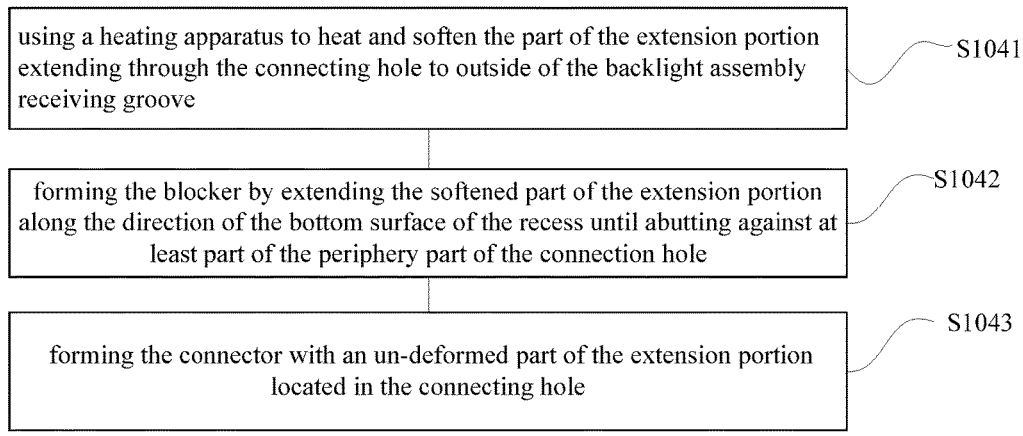
FIG. 10 is a flow chart of processes of step S104 as shown in FIG. 9.

In an embodiment as shown in FIG. 10, the step S104 of forming the blocker 23 and the connector 22 by performing the heat-deforming process on the part of the extension portion 24 extending through the connecting hole to outside of the backlight assembly receiving groove 14 specifically includes the following steps.

Step S1041 is to use a heating apparatus 30 to heat and soften the part of the extension portion 24 extending through the connecting hole 131 to outside of the backlight assembly receiving groove 14. The schematic structures of the extension portion 24 and the heating apparatus 30 as well as the heating process are shown in FIG. 7.

Step S1042 is to form the blocker 23 by extending the softened part of the extension portion 24 along the direction of the bottom surface of the recess 13 until abutting against at least part of the periphery part of the connection hole 131. The schematic structure of the extension portion 24 is shown in FIG. 7 and the schematic structure of the blocker 23 is shown in FIG. 8.

Step S1043 is to form the connector 22 with an un-deformed part of the extension portion 24 located in the connecting hole 131. The schematic structure of the connector 22 is shown in FIG. 8.

Figure 7:
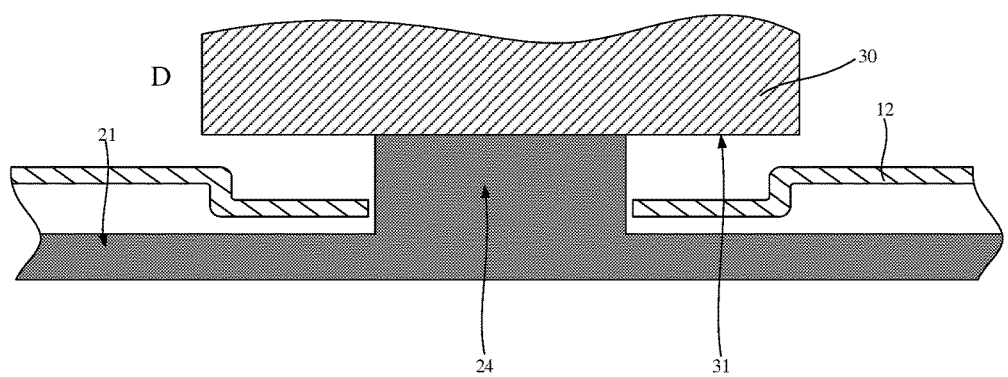
FIG. 7 is a schematic diagram illustrating heating an extension using a heating apparatus on the structure as shown in FIG. 4.

As shown in FIG. 7, during the heating process, the heating apparatus 30 has a heating plane 31 for heating the extension portion 24. An area of the heating plane 31 of the heating apparatus 30 is larger than an opening area of the recess. After the extension portion 24 is softened, the heating plane 31 may abut against the folded edge 12 so that a surface of the resultant blocker 23 facing away from the backlight assembly receiving groove 14 is flush with the folded edge 12. As shown in FIG. 8, when the above-mentioned optional embodiment is implemented, the surface of the blocker 23 facing away from the backlight assembly receiving groove 14 is flush with the folded edge 12.

It will be apparent to those skilled in the art that various modifications and variations may be made to the embodiments of the present disclosure without departing from the spirit and scope of the present disclosure. Thus, it is intended that the present disclosure encompasses such modifications and variations, if such modifications and variations are within the scope of the present patent claims and equivalents thereof.

What is claimed is:

1. A backlight rubber-iron structure, comprising: a back plate and a rubber frame;
   wherein the back plate comprises:
   a bottom plate;
   a plurality of folded edges;
   a backlight assembly receiving groove defined by the bottom plate and the folded edges;
   a plurality of recesses defined at joints of the bottom plate and the plurality of folded edges, each of the plurality of recesses facing away from the backlight assembly receiving groove;

a connecting hole defined through each recess of the plurality of recesses and communicating the each recess with the backlight assembly receiving groove; and a blocking surface defined by at least part of a bottom of each recess of the plurality of recesses located at a periphery of the connecting hole of the each recess, wherein the blocking surface is facing away from the backlight assembly receiving groove;

wherein the rubber frame comprises a rubber frame body, a connector corresponding to the connecting hole in a one-to-one manner, and a blocker corresponding to the recess in a one-to-one manner and connected with the connector; the rubber frame body, the connector and the blocker have an integrated structure;

wherein the rubber frame body is in the backlight assembly receiving groove; the connector extends through the corresponding connecting hole; and the blocker is in the corresponding recess and is clamped with the corresponding recess by abutting against the blocking surface at the bottom of the corresponding recess.

2. The backlight rubber-iron structure according to claim 1, wherein a quantity of the plurality of recesses at the joints of the bottom plate and the folded edges in the back plate is 13-15.

3. The backlight rubber-iron structure according to claim 1, wherein each recess of the plurality of recesses has a rectangular structure, and a long side direction of the rectangular structure is parallel to an extending direction of the folded edge where the rectangular structure is located.

4. The backlight rubber-iron structure according to claim 1, wherein a cross section of each recess of the plurality of recesses is arc-like or trapezoidal with a width increasing in a direction away from the bottom of the each recess.

5. The backlight rubber-iron structure according to claim 1, wherein a distance, from a side of the bottom of a recess of the plurality of recesses facing away from the recess, to the rubber frame body, is 0.5 mm-1 mm.

6. The backlight rubber-iron structure according to claim 1, wherein the blocker and the connector define a T-shaped.

7. The backlight rubber-iron structure according to claim 1, wherein a surface of the blocker facing away from backlight assembly receiving groove is flush with the corresponding folded edge.

8. A backlight, comprising: the backlight rubber-iron structure according to claim 1.

9. A display device, comprising: the backlight according to claim 8.

10. A method of manufacturing the backlight rubber-iron structure according to claim 1, comprising:

forming a back plate which comprises a bottom plate, a plurality of folded edges, a backlight assembly receiving groove defined by the bottom plate and the folded edges, a plurality of recesses defined at joints of the bottom plate and the plurality of folded edges with each of the plurality of recesses facing away from the backlight assembly receiving groove, a connecting hole defined through each recess of the plurality of recesses and communicating the each recess with the backlight assembly receiving groove, and a blocking surface defined by at least part of a bottom of each recess of the plurality of recesses located at a periphery of the connecting hole of the each recess, wherein the blocking surface is facing away from the backlight assembly receiving groove;

forming a rubber frame which comprises a rubber frame body and an extension portion formed on the rubber frame body and corresponding to the connecting hole in a one-to-one manner;

disposing the rubber frame body into the backlight assembly receiving groove and extending the extension portion through the corresponding connecting hole; and forming a blocker and a connector by performing a heat-deforming process on a part of the extension portion extending through the connecting hole to outside of the backlight assembly receiving groove.

11. The method according to claim 10, wherein the forming the blocker and the connector by performing the heat-deforming process on the part of the extension portion extending through the connecting hole to outside of the backlight assembly receiving groove comprises:

using a heating apparatus to heat and soften the part of the extension portion extending through the connecting hole to outside of the backlight assembly receiving groove;

forming the blocker by extending the softened part of the extension portion along a direction of the bottom surface of the recess until abutting against at least part of a periphery part of the connection hole; and form the connector with an un-deformed part of the extension portion located in the connecting hole.

12. The method according to claim 11, wherein a surface of the blocker facing away from backlight assembly receiving groove is flush with the folded edge.

* * * * *